(12) United States Patent
Le

(10) Patent No.: US 7,582,005 B1
(45) Date of Patent: Sep. 1, 2009

(54) PORTABLE AUTOMATIC OYSTER OPENER

(76) Inventor: Chi-Minh Le, P.O. Box 842, Westwego, LA (US) 70094

(*) Notice: Subject to any disclaimer, the term of this patent is extended or adjusted under 35 U.S.C. 154(b) by 103 days.

(21) Appl. No.: 11/776,381

(22) Filed: Jul. 11, 2007

Related U.S. Application Data

(63) Continuation-in-part of application No. 11/186,017, filed on Jul. 20, 2005, now abandoned.

(51) Int. Cl.
  *A22C 29/04* (2006.01)
(52) U.S. Cl. .................................................. 452/16
(58) Field of Classification Search ............ 452/1, 452/12, 15–17, 102–105; 99/568, 571–574, 99/537, 577, 582, 583; 83/628–630, 632, 83/856, 870, 932; 426/482; 30/120.1–120.5, 30/184
See application file for complete search history.

(56) References Cited

U.S. PATENT DOCUMENTS

| | | | |
|---|---|---|---|
| 1,333,843 A | | 3/1920 | Torsch et al. |
| 3,071,802 A | | 1/1963 | Gambardella |
| 3,713,468 A | * | 1/1973 | Walsh .................. 99/580 |
| 3,828,398 A | | 8/1974 | Harris et al. |
| 4,361,933 A | | 12/1982 | Rodman et al. |
| 4,555,928 A | * | 12/1985 | Hansen .................. 72/451 |
| 4,580,436 A | * | 4/1986 | Nelson .................. 72/446 |
| 4,663,805 A | | 5/1987 | Adcock |
| 5,427,567 A | | 6/1995 | Adcock |
| 5,482,500 A | | 1/1996 | Boettner et al. |
| 5,557,958 A | * | 9/1996 | Nishida et al. ............ 72/20.1 |
| 5,823,864 A | | 10/1998 | Watanabe |
| 6,193,596 B1 | | 2/2001 | Adcock |
| 2007/0049187 A1 | | 3/2007 | Le |

OTHER PUBLICATIONS

Assembly and Operating Instructions for Central Machinery 1 Ton Arbor Press, Model 03552, 1997.

* cited by examiner

*Primary Examiner*—Thomas Price
(74) *Attorney, Agent, or Firm*—Garvey, Smith, Nehrbass & North, L.L.C.; Brett A. North

(57) ABSTRACT

An apparatus which automatically forces open shells during the downward stroke of a reciprocating plunger. Opening can occur through shearing of the two shell halves along their seam. The tip of the plunger can be a long inclined blade and wedge shaped. The apparatus may open all sizes of shells by applying a downward force on at least one of the shell halves. Alternatively, both shearing and sliding forces are applied. In one embodiment the shell is placed parallel to the angle of taper of the tip for opening. When the plunger comes down it exerts by frictional shearing force on the shell which causes the halves to slide off each other and open providing access to the inside.

9 Claims, 8 Drawing Sheets

PORTABLE AUTOMATIC OYSTER OPENER

CROSS-REFERENCE TO RELATED APPLICATIONS

This is a continuation-in-part of co-pending U.S. patent application Ser. No. 11/186,017, filed Jul. 20, 2005, which is incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND

The present invention generally relates to seafood peeling and opening. More particularly, the present invention relates to a method and apparatus for automatically opening shells.

Manually opening shells, such as oyster shells, requires much time and effort. It would be advantageous to provide a method and apparatus for automatically opening shells.

SUMMARY

In one embodiment the method and apparatus automatically opens two halves of oyster shells without using a hand hammer to breaks or crack open the shells.

In one embodiment the opening of oyster shells can be assisted by an operator of the apparatus, such as by aligning the shells to be opened under a reciprocating plunger. In one embodiment the operator manually cuts out the oyster from the opened shell.

In one embodiment an individual holds an unopened oyster shell under the press while a plunger moves down, the plunger contacts the shell, and the shell is opened by the downward movement of the press.

In one embodiment the halves of the oyster shells are opened by shearing. In one embodiment the halves of the oyster shells are opened by chiseling.

In one embodiment the method and apparatus automatically opens multiple oyster shells each minute. In one embodiment this process is repeated at least 40 times a minute. In one embodiment this process is repeated at between at least 40 to 60 times a minute. In one embodiment this process is repeated at least 60 times a minute. In one embodiment this process is repeated between 60 and 175 times a minute.

In one embodiment, after the shell is opened, an individual cuts out the oyster from the opened half shells.

In one embodiment the apparatus is powered by an electrical motor. In one embodiment the motor can include a speed control, such as a digital speed control.

In one embodiment the apparatus includes a linkage system, operably connected to a reciprocating plunger, and powered by a motor. In one embodiment the operable connection includes a gear reducer and a linkage system (e.g., a four bar linkage system). The four bar linkage system can be operably connected to a rack system which itself is operably connected to a plunger.

In one embodiment one of the bars of the four bar linkage system is connected to the rack system and this bar is caused to reciprocate back and forth thereby causing the press to reciprocate up and down.

In one embodiment the apparatus applies force on the plunger and tip to contact and separate oyster shells into their component halves. This separation can be accomplished by shearing the two half shells apart from each other. Alternatively, this separation can be accomplished by chiseling the two half shells apart from each other through the seam between the two halves of the shells. Once the two half shells are separated (e.g., the oyster is opened) the interior of the oyster can be access and cut out with a cutting tools, such as a shucking knife.

One embodiment includes an apparatus which automatically forces open shells during the downward stroke of a reciprocating plunger. Opening can occur through shearing of the two shell halves along their seam. The tip of the plunger can be a long inclined blade and wedge shaped. The apparatus may open all sizes of shells by applying a downward force on at least one of the shell halves. Alternatively, both shearing and sliding forces are applied. In one embodiment the shell is placed parallel to the angle of taper of the tip for opening. When the plunger comes down it exerts by frictional shearing force on the shell which causes the halves to slide off each other and open providing access to the inside.

In one embodiment the method and apparatus can be used to open and/or crack oyster shells, crab claws, lobster claws, clamshells, etc.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
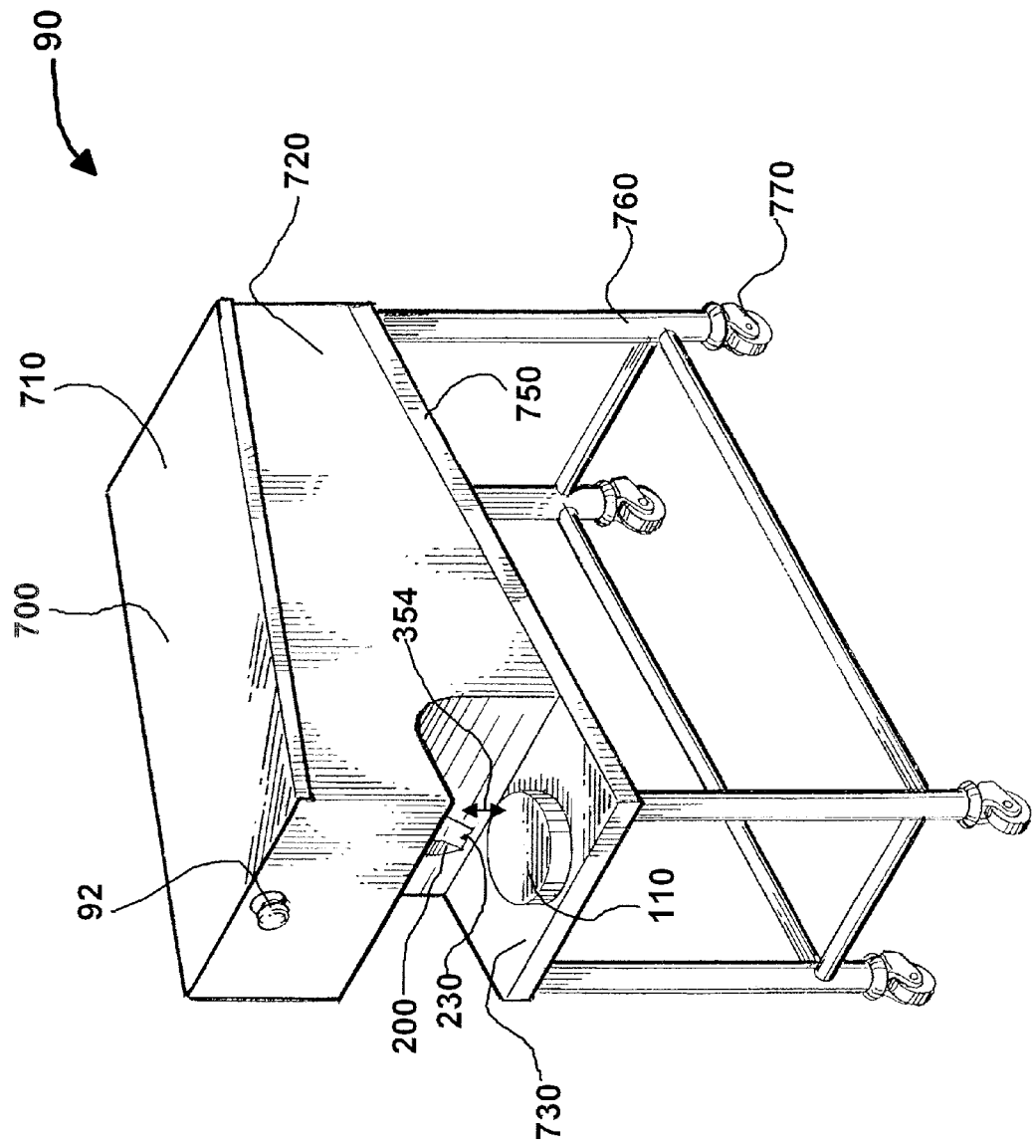
FIG. 1 is a perspective view of one embodiment of the apparatus which can be used for opening oyster shells.

FIG. 1 is a perspective view of one embodiment of the apparatus 90 which can be used for opening oyster shells 10. Generally, a plunger 200 reciprocates up and down (as schematically indicated by arrows 354). As will be explained below an individual can place an unopened oyster shell 10 on base 110 and under plunger 200. When plunger 200 comes down it can shear on half of the shell away from the other half shell (along the seam) thereby opening the shell. Once opened the oyster can be removed from the shell (either by the operator or by another individual). The process can be repeated by placing another unopened oyster shell 10' on base 110 and under plunger 200. By repeated this process oyster shells can be easily opened (and the oyster removed from the shell) without the increased effort required when using manual tools such as hammers and/or shucking knives.

Apparatus 90 can be placed on table 750. Table 750 can include a plurality of legs 760 and a plurality of rollers 770. Rollers 770 can allow table 750 (and apparatus 90) to be easily moved from place to place thus facilitating the portability of apparatus 90. If desired plurality of rollers 770 can be detachably connectable to plurality of legs 760 so that rollers and be removed (and movement of table 750 can be limited) when table 770 is located at a desired location. Alternatively, one or more of the plurality of rollers 770 can be lockable so that rolling can be prevented (locking rollers are conventionally available). Also alternatively, although not shown, plurality of rollers 770 can be slidably connected to plurality of legs 760 so that when desired plurality of rollers 770 can be slid vertically upward where the bottoms of plurality of legs is lower than the bottom of the plurality of rollers. This can be accomplished by attaching each roller to a collar which collar slides up and down one of the legs (either individually or in combination). Set screws can be used to affix the collars at desired vertical locations.

Apparatus 90 can be encased in cabinet 700. Cabinet 700 can include removable top 710, plurality of sides 720, and base 730. Alternatively, base 730 can be part of table 750. Base 110 can be a circular disc and connectable to base 730. Preferably, base 110 is connected by a single fastener in its middle such that base 110 can rotate relative to base 730.

Figure 2:
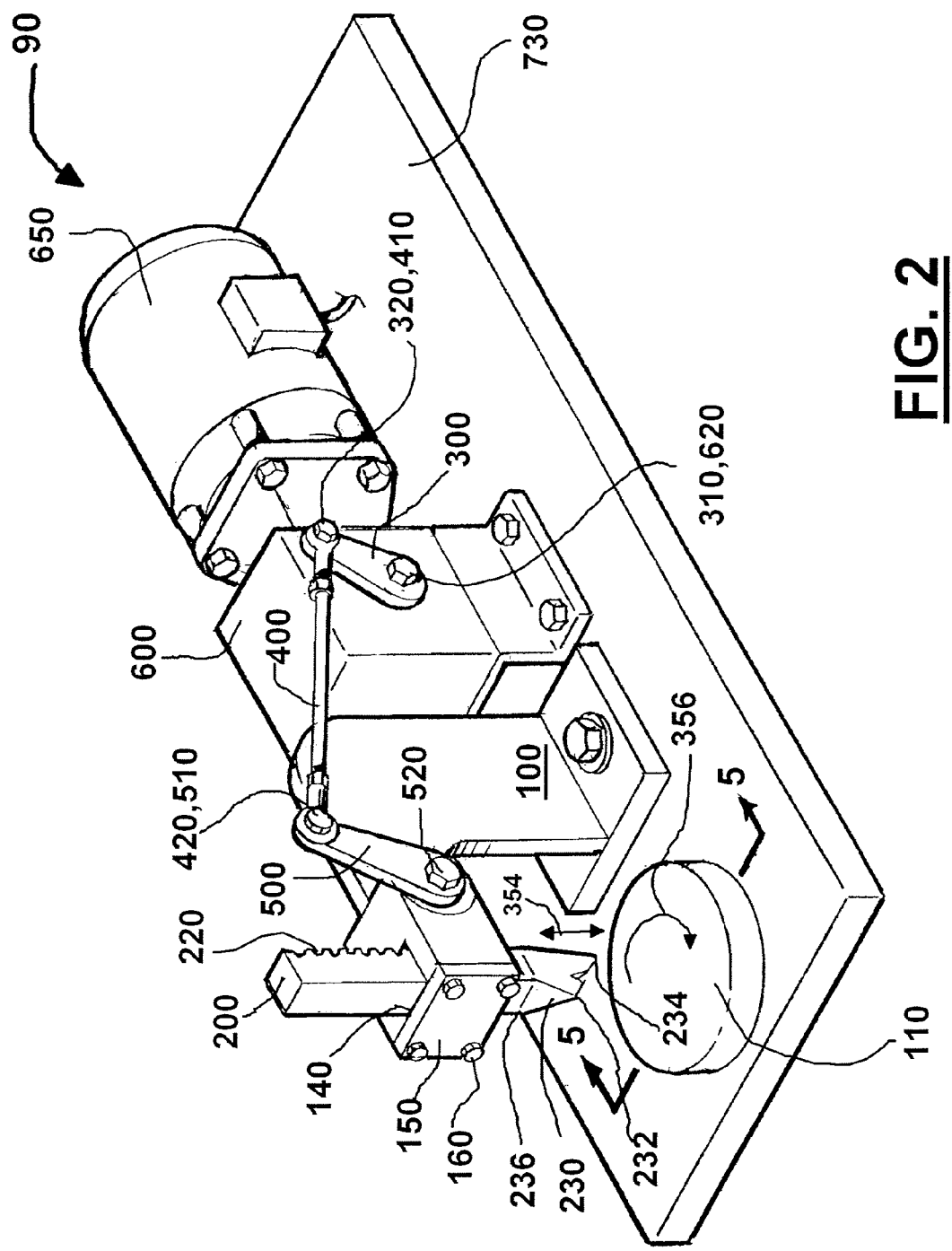
FIG. 2 is a perspective view of the internal components of the apparatus of FIG. 1.
Figure 3:
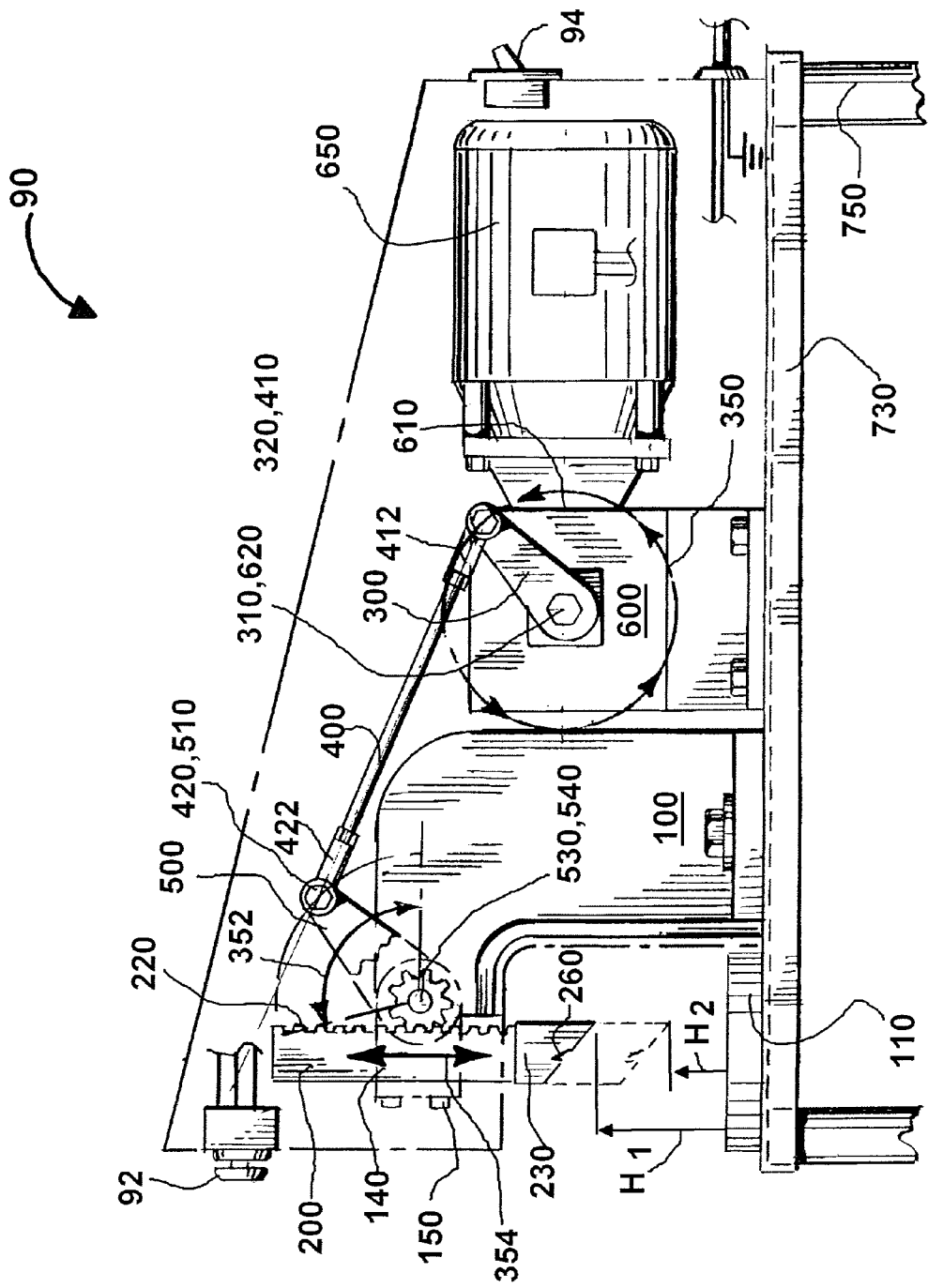
FIG. 3 is a side view schematically illustrating operation of the apparatus of FIG. 1.

FIG. 2 is a perspective view of the internal components of the apparatus 90. FIG. 3 is a side view schematically illustrating operation of apparatus 90. Generally, apparatus 90 can include a reciprocating plunger 200 driven by motor 650. Motor 650 can drive plunger 200 by means of gear reducing box 600 and a driving linkage which reciprocatingly drives plunger 200 in press 100. Motor 650 can be operably connected to gear box 600 through input shaft 610. Rotation of input shaft 610 causes output shaft 620 to rotate (albeit at a reduced rotation rate depending on the internal gear reduction of gear box 600). Output shaft 620 can be used to drive a four bar driving linkage system.

The driving linkage can be a four bar linkage system including arm 300, arm 400, arm 500, along with the theoretical bar between arm 500 and 300. Arm 300 can include first end 310 and second end 320. First end 310 can be rotationally connected to output shaft 620 pf gear box 600. Preferably, output shaft 620 is controlled to rotate in the rotational amounts/ranges specified in this application. Alternatively, motor 650 can be directly connected to first end 320—however, the rotational rates of motors typically are too fast and for the rates of reciprocation desired for plunger 200 and a reduction is desirable (which is obtained by gear box 600). Second end 320 is pivotally connected to first end 410 of second arm 400. Second end 420 of second arm 400 is pivotally connected to first end 510 of third arm 500. Second end 520 of third arm 500 is rotationally connected to gear 530. Teeth 540 of gear 530 for a rack and pinion type connection with teeth 220 of plunger 200. Plunger 200 is slidably connected to press 100 through opening 140.

Motor 650 can cause first arm 300 to rotate (schematically indicated by arrows 350, although rotation in the opposition direction as arrows 350 will work equally well). Rotation of arm 300 causes an angular reciprocation of arm 500 (as schematically indicated by arrows 352). Preferably, arm 500 only reciprocates and does not make complete revolutions—angular reciprocation causes the linear reciprocation of plunger 200, whereas rotation would eject plunger from opening 140.

In FIG. 3 H1 and H2 indicate the upper and lower heights of plunger tip 230 relative to base 110. The difference between H1 and H2 is the amount of linear reciprocation of plunger 200. The amount of reciprocation is controllable by many factors such as the diameter of gear 530 (increasing the diameter increases the amount of reciprocation). Additionally, the relative lengths of the four bars also control the amount of angular reciprocation of arm 500 (schematically indicated by arrows 352)—the larger the amount of angular reciprocation of arm 500 increasing the amount of linear reciprocation of plunger 200. In this embodiment the length of arm 400 can be adjusted by adjusting members 422 and/or 412. Similarly, the lengths of arms 300 and 500 can be set up so that they are adjustable. Additionally, the distance between press 100 and gear box 600 can be increased and/or decreased which increases and/or decreases the length of the theoretical fourth bar. H2 can be set at a desired level by removing plate 140 (through plurality of fasteners 150) and setting plunger 200 at the desired linear rotation—at a point when arm 500 is at its maximum extent of angular rotation.

Preferably, tip 230 has an upper 232 and lower point 234, where the upper point 232 is toward the front and higher than the lower point 234. Also preferably, tip 230 has a V-shape where it increases in width to its top 236. Also preferably, tip 230 will include at least one discontinuity such as notch 260. Notch 260 can resist sliding of tip relative to the oyster shell to be opened (during the downward plunging process).

Figure 4:
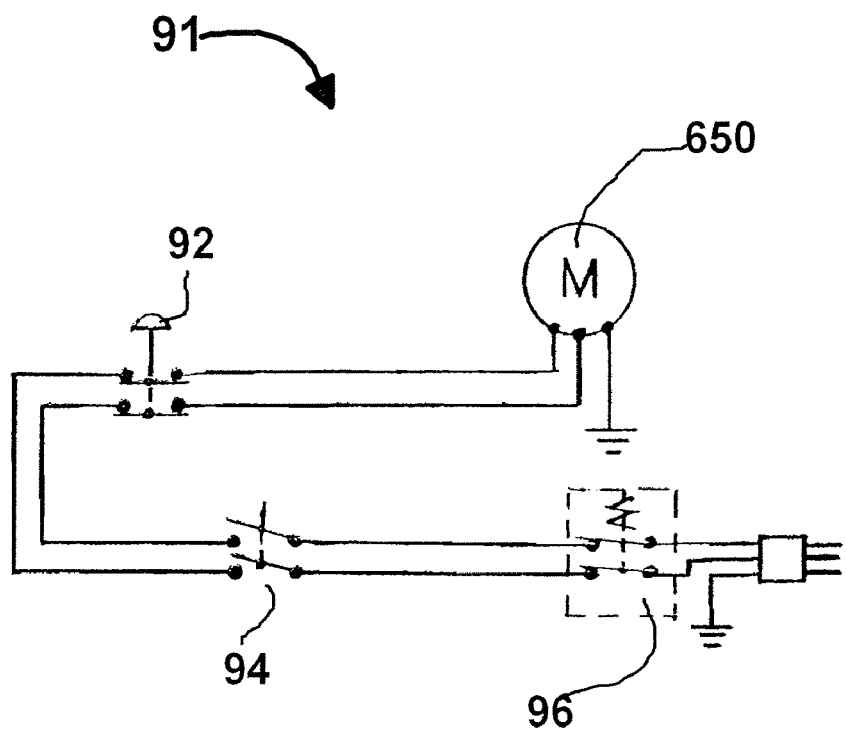
FIG. 4 is a schematic view of electrical circuit powering the apparatus.

FIG. 4 is a schematic view of electrical circuit 91 powering apparatus 90. Circuit 91 can include motor 650 connected to emergency stop switch 92 (which alternatively can be an on off toggle switch), on off switch 94, and breaker 96. A power supply supplies power to circuit 91.

Figure 5:
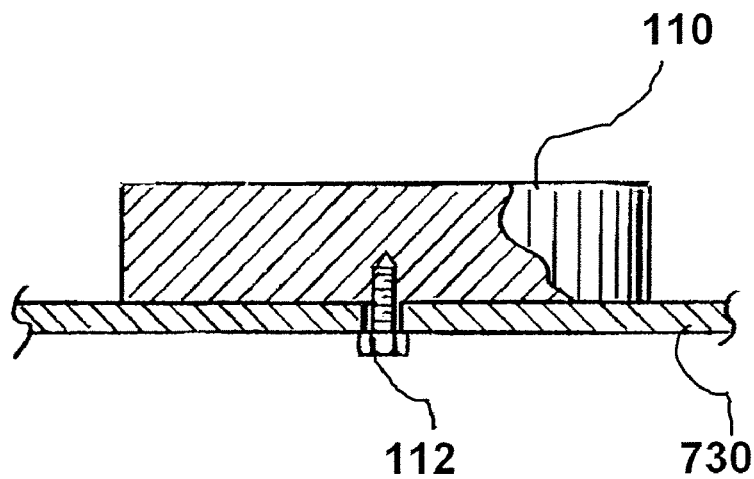
FIG. 5 is a sectional view taken along the lines 5-5 of FIG. 2.

FIG. 5 is a sectional view of base 110 taken along the lines 5-5 of FIG. 2. Here, base 110 is rotationally connected to base 730 by fastener 112. It is believe that allowing base 110 to rotate facilitates the opening process of shells 10 when plunger 200 moves downwardly.

Figure 6:
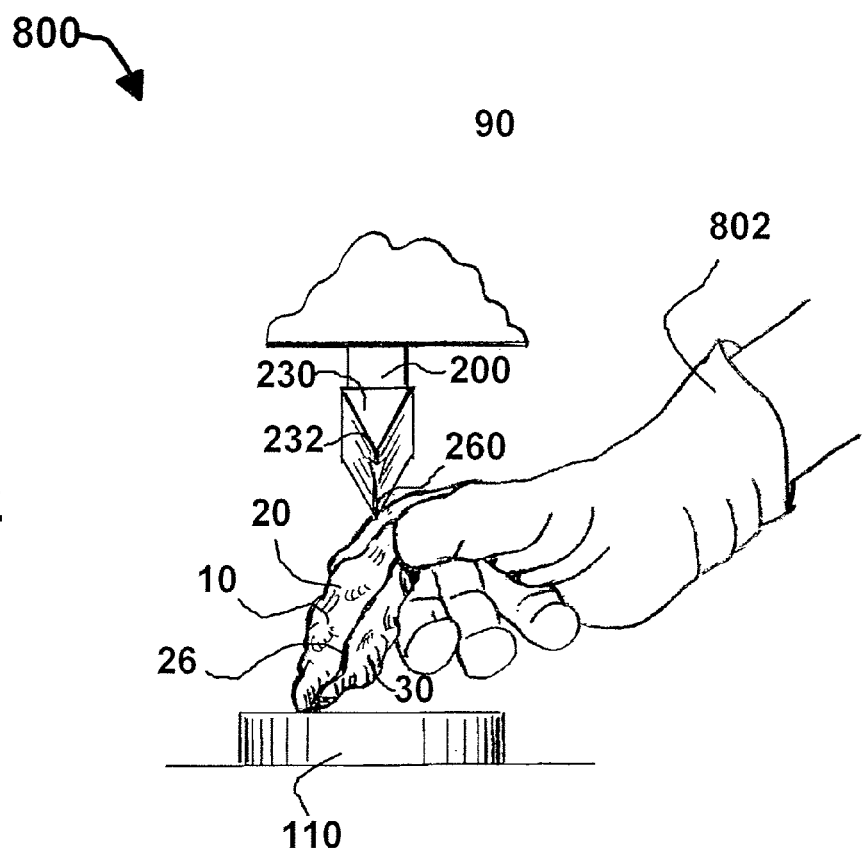
FIG. 6 is a front view of an individual holding a shell to be opened (e.g., looking in the direction of line 5-5 of FIG. 2.
Figure 7:
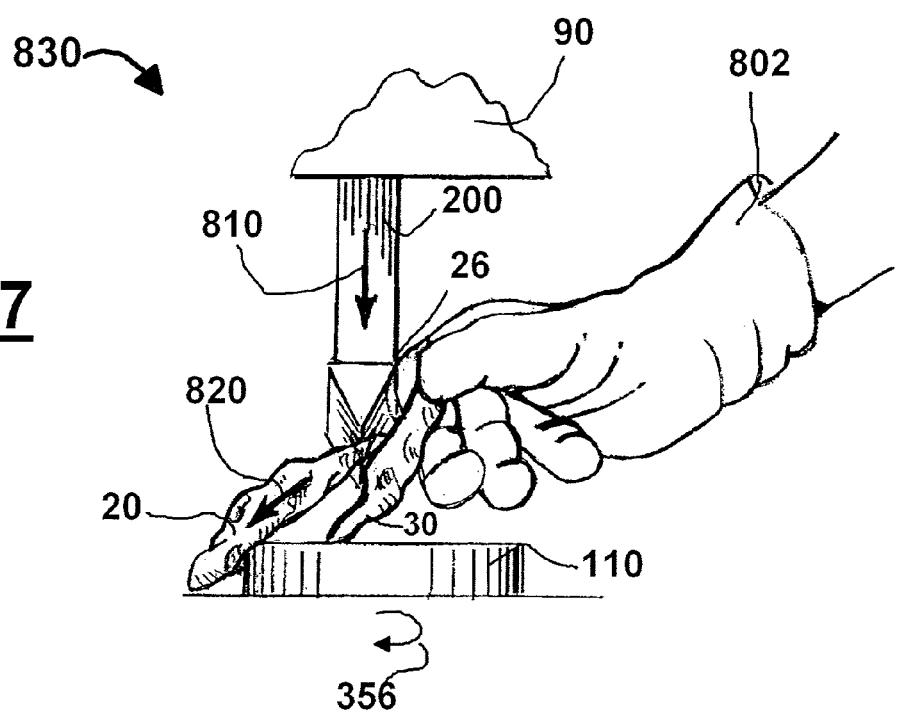
FIG. 7 is a front view of the shell of FIG. 6 after it has been opened.
Figure 8:
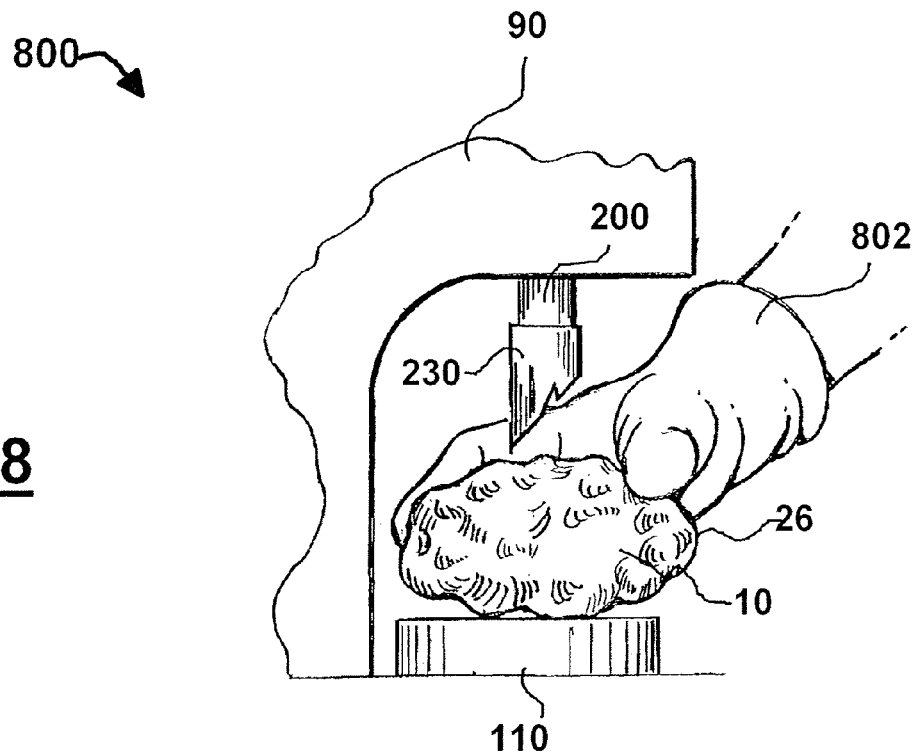
FIG. 8 is a side view of FIG. 6.

FIGS. 6 through 9 illustrate various steps in one embodiment of the method. FIGS. 6 and 8 schematically indicate the placement step for inserting shell 10 into apparatus 90—which is labeled as step 800. FIG. 6 is a front view of an individual 802 holding an example shell 10 to be opened (e.g., looking in the direction of line 5—5 of FIG. 2). FIG. 8 is a side view of FIG. 6. Shell 10 can be placed into apparatus 90 when plunger 200 is at the upper end of its linear reciprocation. Shell 10 can include shell halves 20 and 30 which halves are attached at seam 30, and can be roughly elliptical in shape. Shell 10 can be placed with the major axis of the ellipse roughly parallel to base 110 (as shown in FIG. 8). Additionally, shell 10 can be place with its minor axis slightly skewed from the vertical as shown by FIG. 6 (such as by 15 degrees from the vertical). Placement of shell 10 slightly skewed allows tip 230 to contact one of the halves (e.g., 20) instead of the seam 26. In this way first half 20 will be sheared off of second half 30 thereby allowing easy access to the oyster inside of the shell 10.

Figure 9:
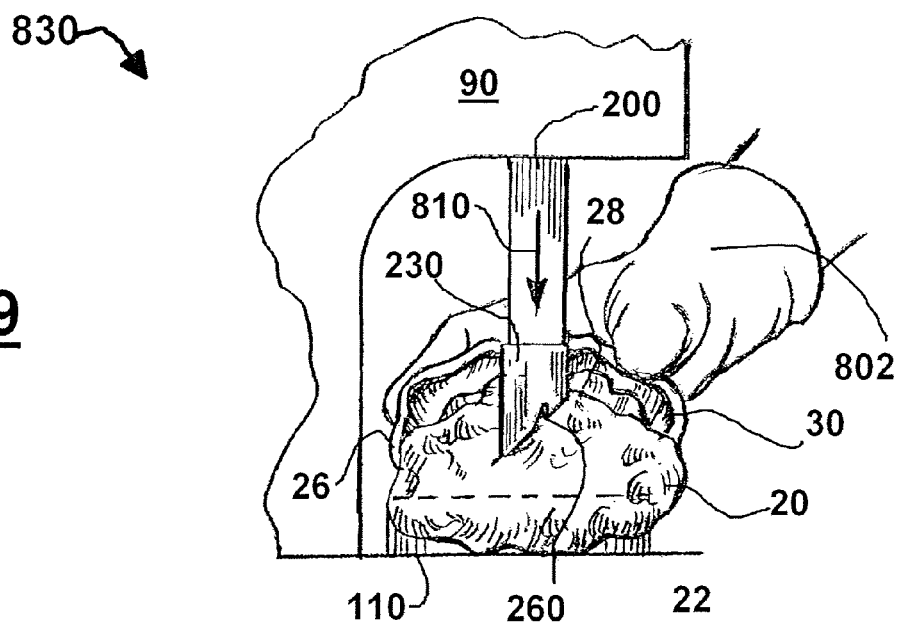
FIG. 9 is a side view of FIG. 7.

FIGS. 7 and 9 schematically indicate this shearing process which is labeled as step 810. FIG. 7 is a front view of shell 10 after it has been opened. FIG. 9 is a side view of FIG. 7. Arrow 810 schematically indicates that tip 230 is moving downward. Arrow 820 schematically indicates that shell half 20 is being separated from shell half 30. Arrow 356 schematically indicates that base 110 can rotate during this process. Rotation indicated by allow 356 can optimally place shell 10 in relation to tip 230 for separation of the shell halves.

After it completes its downward movement in the direction of arrow 810, plunger will move up in the opposite direction of arrow 810 and another shell 10' can be placed under plunger for opening. After opening the second shell then another shell 10" can be placed under plunger 200 for opening. This process can be repeated until the operator finishes opening shells 10. However, during this process no manual opening of the shell is required thereby greatly facilitating the opening process and preventing the operator from being fatigued.

It is believed that shearing the shell halves works better than attempting to chisel open the shell halves at seam 26. This is because tip 230 will tend to crack portions of shell halves at seam during the chiseling process and such pieces can get into the oyster.

Figure 10:
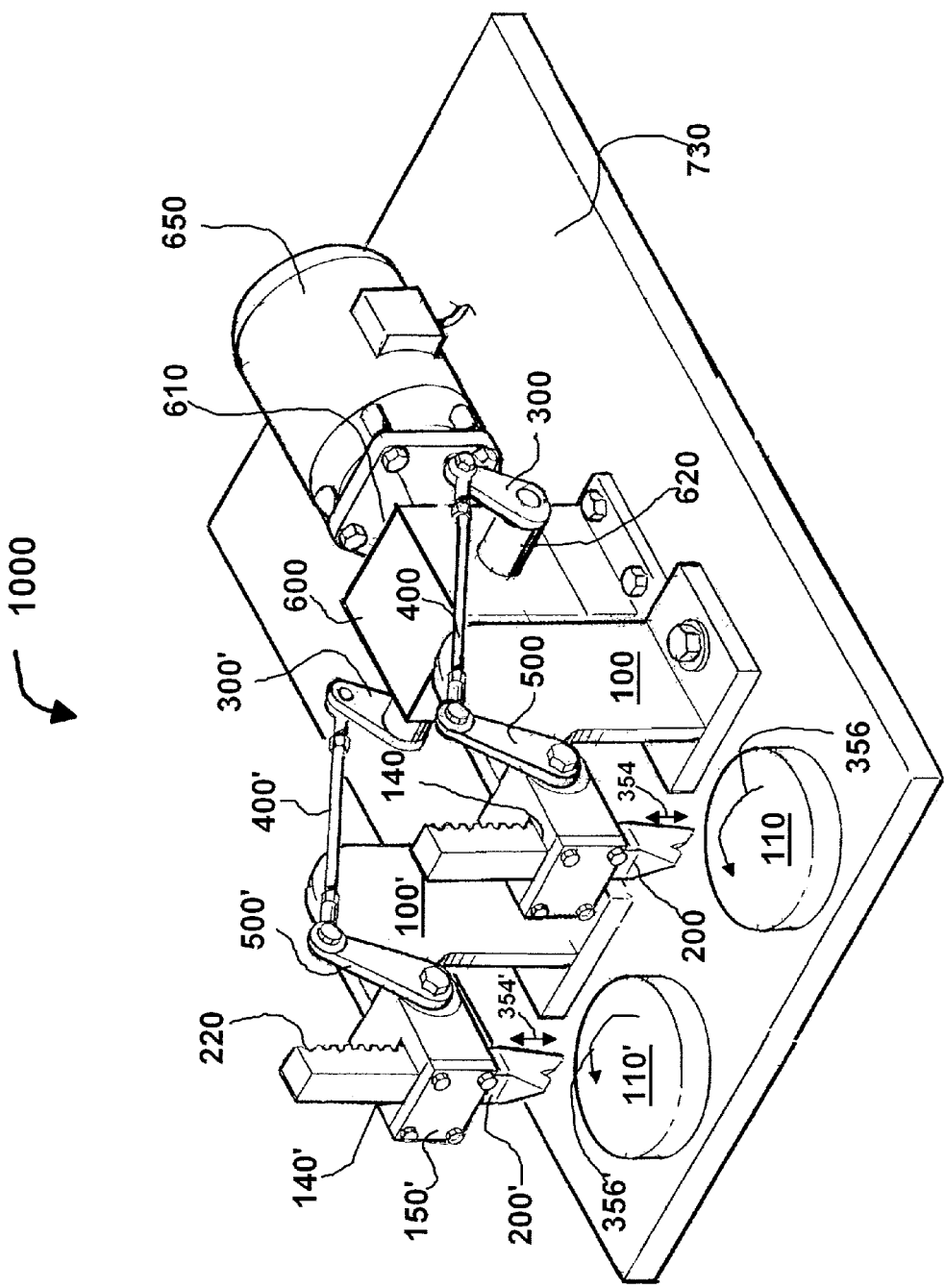
FIG. 10 is a side view of an alternative apparatus including a double mechanical separator with opposing plungers.

FIG. 10 is a side view of an alternative apparatus including a double mechanical separator 1000 with adjacent plungers 200, 200'. In this embodiment gear box includes two output shafts 620, 620' which are driven by motor 650. Conventionally available gear boxes do come with two output shafts. Output shaft 620 shaft drives plunger 200 in the same way as described above for a single plunger. However, output shaft 620' drives a second plunger 200'. The four bar driving mechanism can be exactly the same as that described above and will not be again described. Additionally, the two plungers 200, 200' are preferably in sync so that a single individual can simultaneously hold two shells 10, 10' for opening by plungers 200, 200'. Alternatively, a second motor 650' can be operably connected to a second gear box 600' which has an output shaft which drives the second four bar mechanism and plunger 200'.

Figure 11:
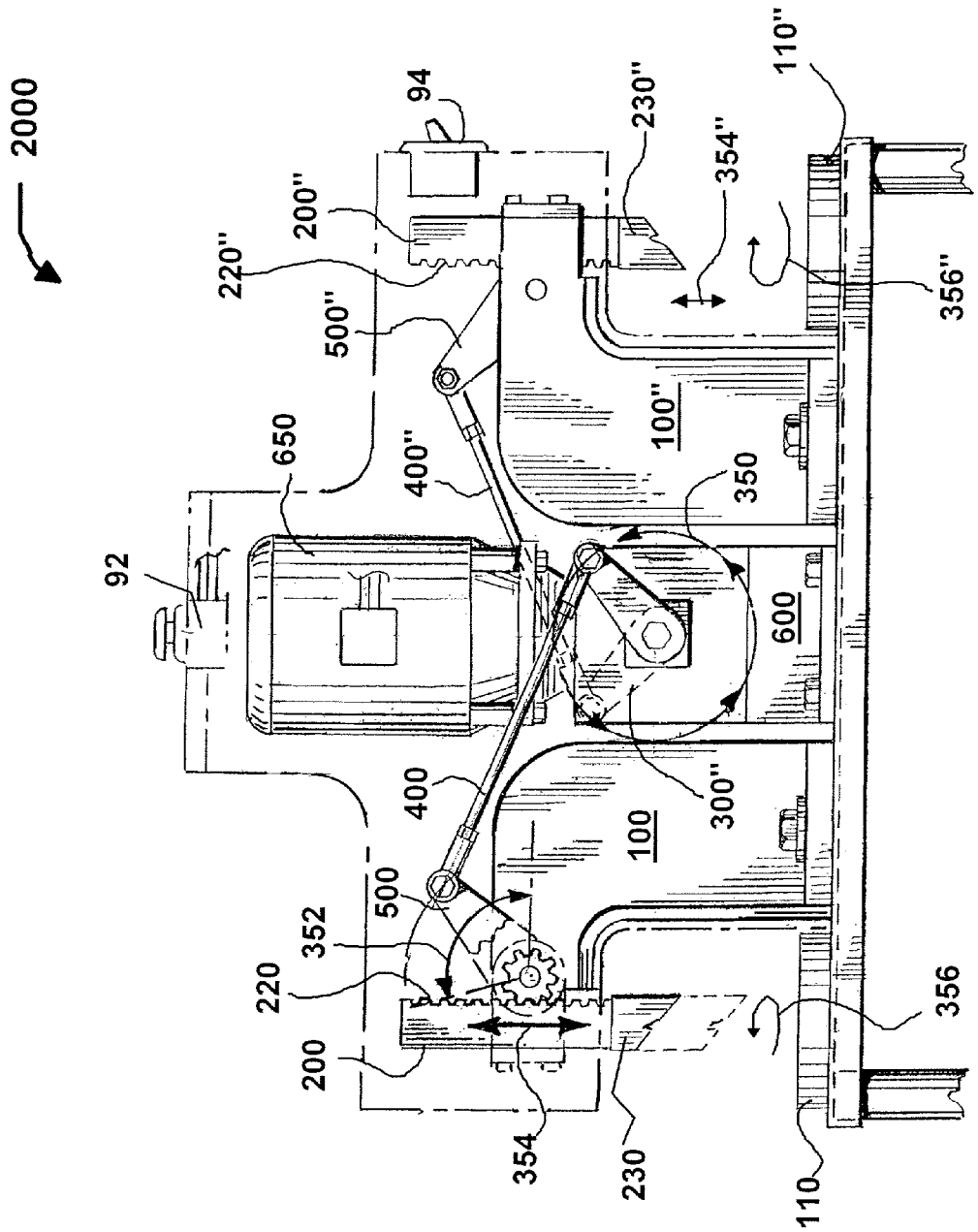
FIG. 11 is a side view of an alternative apparatus including a double mechanical separator with adjacent plungers.

FIG. 11 is a side view of an alternative apparatus including a double mechanical separator 2000 with opposing plungers 200, 200". In this embodiment gear box includes two output shafts 620, 620' which are driven by motor 650. Conventionally available gear boxes do come with two output shafts. Output shaft 620 shaft drives plunger 200 in the same way as described above for a single plunger. However, output shaft 620" drives a second plunger 200". The four bar driving mechanism can be exactly the same as that described above and will not be again described. Two individuals can use apparatus 90 using plungers 200, 200'—the two individuals using shells 10, 100' for opening by plungers 200, 200'. Alternatively, a second motor 650' can be operably connected to a second gear box 600" which has an output shaft which drives the second four bar mechanism and plunger 200".

Apparatus 90 has the unprecedented ability to open between 40 to 60 shells per minute and can increases in productivity depending on the operator and frequency of use. Furthermore, because of motor's 650 speed, this invention has an output capacity of 175 reciprocations per minute for opening shells. The operator is not required to use each cycle of the plunger for opening a new shell—but instead can skip one or more cycles.

The following is a list of parts and materials suitable for use in the present invention.

PARTS LIST

| Part Number | Description |
|---|---|
| 10 | shell |
| 20 | first half |
| 22 | outer surface |
| 26 | seam |
| 28 | meat |
| 30 | second half |
| 40 | seam |
| 50 | oyster |
| 90 | apparatus |
| 91 | circuit |
| 92 | on/off switch or emergency shutoff switch |
| 94 | on/off switch |
| 96 | breaker |
| 100 | press (such as Harbor Freight Tool one ton press) |
| 110 | base |
| 120 | support |
| 140 | opening |
| 150 | plate |
| 160 | plurality of fasteners |
| 200 | plunger |
| 210 | shaft |
| 220 | teeth |
| 230 | tip or splitter section |
| 232 | front |
| 234 | rear |
| 240 | first end |
| 250 | second end |
| 260 | notch |
| 270 | enlarged section |
| 280 | fasteners |
| 290 | base |
| 292 | bore |
| 294 | fastener |
| 300 | arm |
| 310 | first end |
| 320 | second end |
| 350 | arrow |
| 352 | arrow |
| 354 | arrow |
| 356 | arrow |
| 400 | arm |
| 410 | first end |
| 412 | adjustment for first end |
| 420 | second end |
| 414 | adjustment for second end |
| 500 | arm |
| 510 | first end |
| 520 | second end |
| 530 | gear |
| 540 | teeth |
| 550 | arm |
| 600 | gear reducing box (e.g., Dayton model number 4Z298) |
| 610 | input shaft |
| 620 | output shaft |
| 630 | gear reducing mechanism |
| 650 | motor (e.g., Dayton model number 6J29) |
| 700 | cabinet |
| 710 | top |
| 720 | sides |
| 730 | base |
| 750 | table |
| 760 | legs |
| 770 | rollers |
| 800 | step of positioning oyster |
| 802 | hand |
| 810 | arrow |
| 820 | arrow |
| 830 | step of separating two halves of oyster shell (e.g., by shearing or by chiseling) |
| 840 | step of removing oyster meat from shell |
| 1000 | double mechanical separator with opposing plungers |
| 2000 | double mechanical separator with adjacent plungers |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A apparatus for opening the shells of a bivalve mollusk having a pair of shells with an interface therebetween, comprising:
   (a) a reciprocating plunger, the reciprocating plunger including a tapered tip for engaging the interface between the pair of shells when opening the shells, the reciprocating plunger being connected to a motor drive with a linkage,
   (b) a base located under the reciprocating plunger, the base being rotatable relative to the plunger, and
   (c) wherein the motor and linkage move the plunger between upper and lower positions relative to the base.

2. The apparatus of claim 1, wherein the linkage includes a gear box connected to the plunger.

3. The apparatus of claim 1, wherein the linkage includes a four bar mechanism that is operably connected to the plunger.

4. The apparatus of claim 1, wherein the tip includes a front and rear areas and the front is elevated relative to the rear, and a notch is positioned between the front and rear areas.

5. The apparatus of claim 4, wherein the tip includes a bottom and a top, and the tip widens from the bottom to the top.

6. The apparatus of claim 5, wherein the tip has a V-shape.

7. The apparatus of claim 1, wherein the linkage includes a rack and pinion system.

8. The apparatus of claim 1, the linkage includes a second reciprocating plunger including a second tip for opening shells, the second reciprocating plunger being operatively connected to the motor, and a second base located under the second reciprocating plunger, the second base being rotatable relative to the second plunger.

9. The apparatus of claim 8, wherein the second plunger is adjacent the first plunger.

* * * * *